US012115977B2

(12) United States Patent
Kasarla et al.

(10) Patent No.: US 12,115,977 B2
(45) Date of Patent: Oct. 15, 2024

(54) VEHICULAR CONTROL SYSTEM WITH ROAD SURFACE AND DEBRIS DETECTION AND CLASSIFICATION

(71) Applicant: Magna Electronics Inc., Auburn Hills, MI (US)

(72) Inventors: Nagender Reddy Kasarla, New Hudson, MI (US); Sujith Gurram, Orion Township, MI (US); Suresh Boddi, New Hudson, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 281 days.

(21) Appl. No.: 17/654,244

(22) Filed: Mar. 10, 2022

(65) Prior Publication Data

US 2022/0289175 A1    Sep. 15, 2022

Related U.S. Application Data

(60) Provisional application No. 63/200,984, filed on Apr. 7, 2021, provisional application No. 63/200,486, filed on Mar. 10, 2021.

(51) Int. Cl.
*B60W 30/09*    (2012.01)
*B60W 10/18*    (2012.01)
(Continued)

(52) U.S. Cl.
CPC .......... *B60W 30/09* (2013.01); *B60W 10/18* (2013.01); *B60W 10/20* (2013.01); *B60W 10/22* (2013.01);
(Continued)

(58) Field of Classification Search
CPC .. B60W 30/09; B60W 50/14; B60W 2552/35; B60W 2556/65; B60W 2552/50;
(Continued)

(56) References Cited

U.S. PATENT DOCUMENTS 5,550,677 A    8/1996 Schofield et al.
5,652,655 A    7/1997 Uno et al.
(Continued)

FOREIGN PATENT DOCUMENTS

EP          3460402 A1 *  3/2019  ............ B60W 30/06
WO    WO-2017089057 A1 *  6/2017  ............ B60W 30/09

OTHER PUBLICATIONS

Shambhu et al., "Pothole Detection and Inter Vehicular Communication," 2014, Publisher: IEEE.*
(Continued)

*Primary Examiner* — Tuan C To
(74) *Attorney, Agent, or Firm* — HONIGMAN LLP (57) ABSTRACT

A vehicular control system includes a plurality of sensors disposed at a vehicle and an electronic control unit (ECU). The vehicular control system, responsive to processing at the ECU of sensor data captured by one of the plurality of sensors, detects an object in the path of the vehicle. The object may be one selected from the group consisting of (i) a pothole, (ii) road debris, and (iii) a speed bump. The ECU, responsive to detecting the object in the path of the vehicle, provides an output to another ECU. The other ECU, responsive to receiving the output, controls two or more of (i) braking of the vehicle, (ii) steering of the vehicle, and (iii) suspension of the vehicle.

23 Claims, 5 Drawing Sheets

(51) Int. Cl.
  *B60W 10/20* (2006.01)
  *B60W 10/22* (2006.01)
  *B60W 50/14* (2020.01)

(52) U.S. Cl.
  CPC ....... *B60W 50/14* (2013.01); *B60W 2050/143* (2013.01); *B60W 2050/146* (2013.01); *B60W 2420/403* (2013.01); *B60W 2420/408* (2024.01); *B60W 2552/10* (2020.02); *B60W 2552/35* (2020.02); *B60W 2552/50* (2020.02); *B60W 2554/20* (2020.02); *B60W 2556/65* (2020.02); *B60W 2710/18* (2013.01); *B60W 2710/20* (2013.01); *B60W 2710/22* (2013.01)

(58) Field of Classification Search
  CPC ..... B60W 2420/408; B60W 2050/143; B60W 2050/146; B60W 2420/403; B60W 2710/18; B60W 2710/20; B60W 2710/22
  USPC .......................................................... 701/26
  See application file for complete search history.

(56) References Cited

U.S. PATENT DOCUMENTS

| | | | |
|---|---|---|---|
| 5,670,935 A | 9/1997 | Schofield et al. | |
| 5,949,331 A | 9/1999 | Schofield et al. | |
| 7,038,577 B2 | 5/2006 | Pawlicki et al. | |
| 7,720,580 B2 | 5/2010 | Higgins-Luthman | |
| 7,742,864 B2* | 6/2010 | Sekiguchi | B60K 31/0008 180/169 |
| 7,855,755 B2 | 12/2010 | Weller et al. | |
| 8,224,031 B2* | 7/2012 | Saito | G06V 10/753 382/104 |
| 10,071,687 B2 | 9/2018 | Ihlenburg et al. | |
| 10,099,614 B2 | 10/2018 | Diessner | |
| 10,967,971 B2* | 4/2021 | Baur | G05D 1/0038 |
| 11,081,008 B2* | 8/2021 | Gupta | H04N 7/183 |
| 11,104,345 B2* | 8/2021 | Theodosis | B60W 10/22 |
| 11,454,510 B1* | 9/2022 | Gray | G07C 5/008 |
| 11,532,168 B2* | 12/2022 | Smolyanskiy | G01S 17/89 |
| 11,584,377 B2* | 2/2023 | Cox | B60W 30/0956 |
| 11,823,395 B2 | 11/2023 | Raveendran | |
| 2004/0212863 A1 | 10/2004 | Schanz et al. | |
| 2006/0050270 A1 | 3/2006 | Elman | |
| 2009/0078870 A1 | 3/2009 | Haruna | |
| 2010/0020170 A1 | 1/2010 | Higgins-Luthman et al. | |
| 2012/0140233 A1 | 6/2012 | Rockwell et al. | |
| 2018/0165957 A1* | 6/2018 | Weber | G08G 1/09623 |
| 2018/0321142 A1 | 11/2018 | Seifert | |
| 2021/0097311 A1* | 4/2021 | McBeth | H04W 4/80 |
| 2021/0146944 A1* | 5/2021 | Kundu | B60W 50/085 |
| 2021/0197858 A1* | 7/2021 | Zhang | G08G 1/161 |
| 2021/0221363 A1* | 7/2021 | Lai | G08G 1/165 |

OTHER PUBLICATIONS

Kwang et al., "Smart Speed Bump Detection and Estimation with Kinect," 2018, Publisher: IEEE.*

Daniel et al., "Imaging radar for navigation and surveillance on an autonomous unmanned ground vehicle capable of detecting obstacles obscured by vegetation," 2019, Publisher: IEEE.*

* cited by examiner

VEHICULAR CONTROL SYSTEM WITH ROAD SURFACE AND DEBRIS DETECTION AND CLASSIFICATION

CROSS REFERENCE TO RELATED APPLICATIONS

The present application claims the filing benefits of U.S. provisional application Ser. No. 63/200,984, filed Apr. 7, 2021, and U.S. provisional application Ser. No. 63/200,486, filed Mar. 10, 2021, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a driving assistance system or vision system or control system for a vehicle that includes a plurality of sensors disposed at a vehicle equipped with the vehicular control system and each having a field of sensing exterior of the vehicle. The plurality of sensors capture sensor data. The system includes an electronic control unit (ECU) that includes electronic circuitry and associated software. The electronic circuitry of the ECU includes a processor for processing sensor data captured by at least one sensor of the plurality of sensors to detect presence of an object. The vehicular control system, responsive to processing by the processor of sensor data captured by the plurality of sensors, detects an object in a path of travel of the equipped vehicle as the equipped vehicle travels along a traffic lane of a road. The object includes at least one selected from the group consisting of (i) a pothole ahead of the equipped vehicle in the traffic lane of the road, (ii) road debris ahead of the equipped vehicle in the traffic lane of the road, and (iii) a speed bump ahead of the equipped vehicle in the traffic lane of the road. The ECU, responsive to detecting the object in the path of travel of the equipped vehicle, provides output to another ECU of the equipped vehicle. The other ECU of the equipped vehicle is operable to control two or more selected from the group consisting of (i) braking of the equipped vehicle, (ii) steering of the equipped vehicle, and (iii) suspension of the equipped vehicle. The other ECU of the equipped vehicle, responsive to receiving the provided output, controls the two or more selected from the group consisting of (i) braking of the equipped vehicle, (ii) steering of the equipped vehicle, and (iii) suspension of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
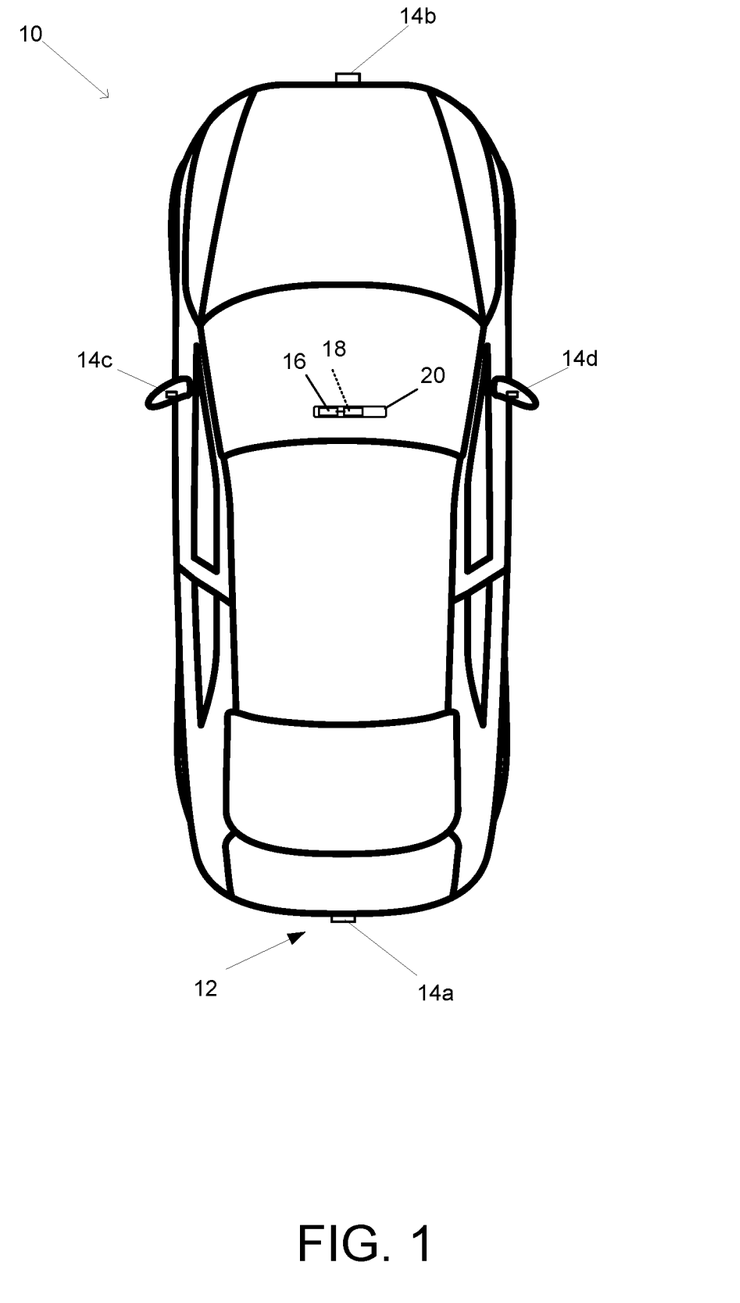
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Advanced driver-assistance systems (ADAS) are commonly provided on vehicles to increase safety and comfort of the occupants. These systems may include a variety of sensors such as cameras, radar sensors, lidar sensors, GPS sensors, accelerometers, etc. Implementations herein include a driver or driving assist system that utilizes sensor data (i.e., data captured by any number of sensors for ADAS systems, such as sensor data captured by a lidar sensor, a radar sensor, and/or one or more cameras 14 or image sensors of the vehicle) either individually or using sensor fusion to detect an object on or within the traffic lane of the road the vehicle is travelling along such as wreckage or other debris, potholes, speed bumps, etc. Sensor fusion is commonly defined as the combining of sensory data or data derived from different sources and/or sensors such that the resulting information has less uncertainty than the sources individually.

Figure 2:
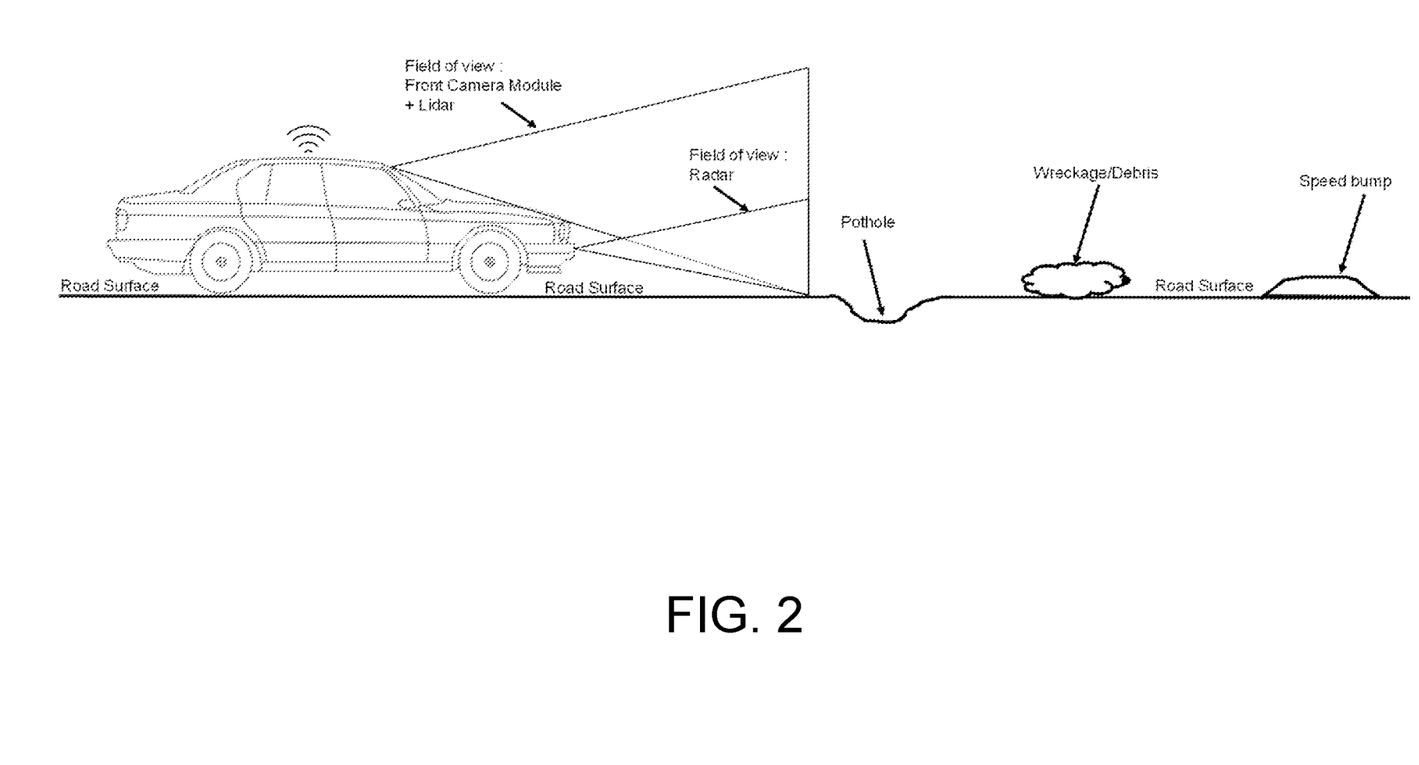
FIG. 2 is a side plan view of a vehicle equipped with the vision system approaching a pothole and road debris.

Referring now to FIG. 2, the system may include a main or primary ECU or ADAS ECU or other control that processes and transfers signals or sensor data (e.g., image data from a camera (e.g., a forward viewing camera disposed at an in-cabin side of a windshield of the equipped vehicle and viewing through the windshield forward of the vehicle) and/or radar data from a radar sensor and/or lidar data from a lidar sensor) to other ECUs such as a steering ECU, a braking ECU, a suspension ECU, etc., to control the vehicle as appropriate (e.g., brake or steer to avoid an object, adjust suspension in preparation of a collision, etc.). For example, the system controls the vehicle to avoid or minimize impact with potholes, debris, and speed bumps the vehicle encounters.

Figure 3:
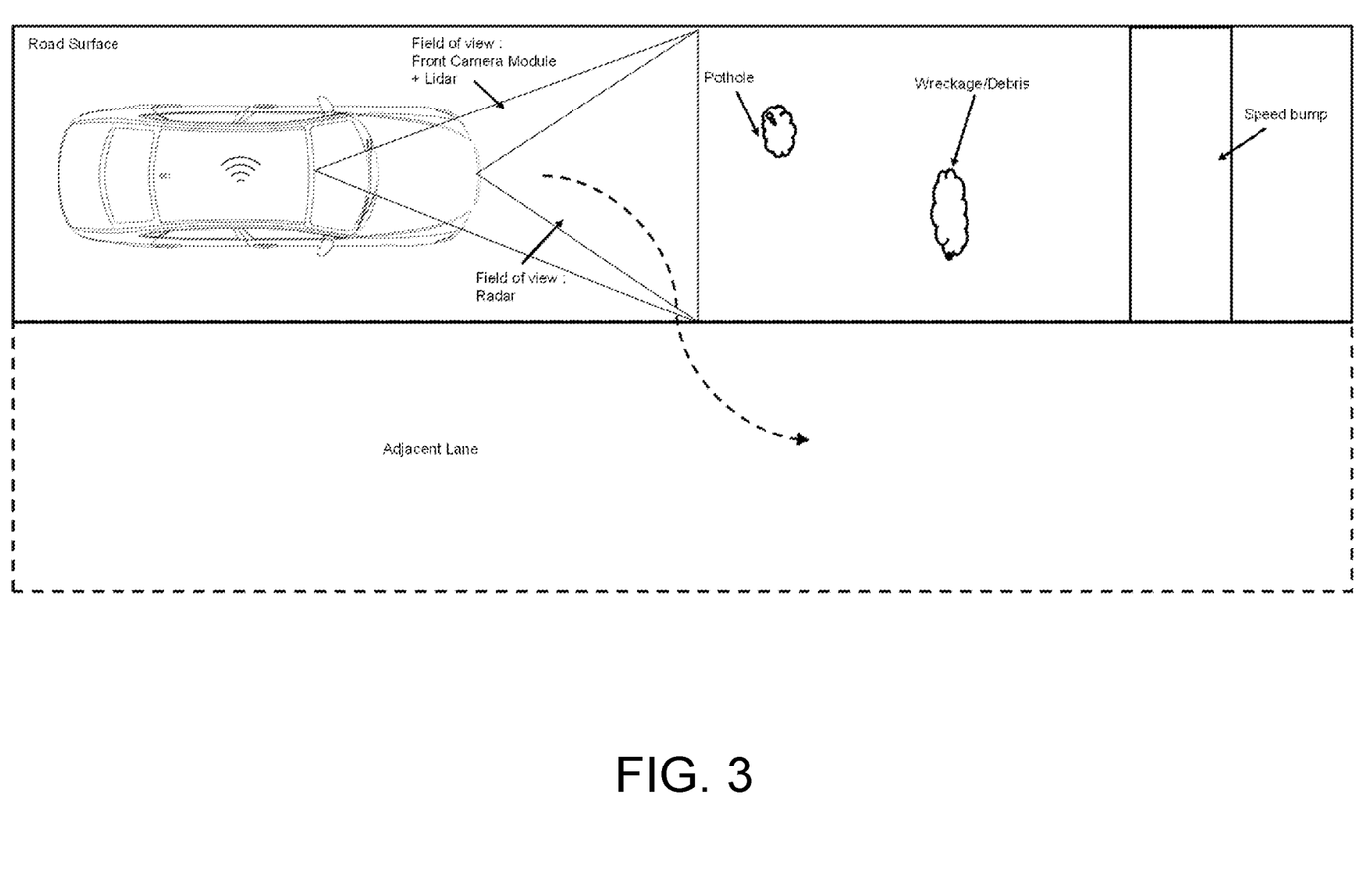
FIG. 3 is a top plan view of the vehicle of FIG. 2 maneuvering into an adjacent lane to avoid the pothole and road debris.

Referring now to FIG. 3, when the system determines that an object is within the path of the vehicle as the vehicle travels along a traffic lane of a road (or any other surface, such as a parking lot or structure), the ECUs (e.g., the ADAS ECU, the braking ECU, the steering ECU, etc.) may work in conjunction to decelerate and/or steer the vehicle as needed by applying brakes and steering to avoid or reduce impact (when not avoidable) with the object. The system may transfer data to another vehicle and/or infrastructure (e.g., a road safety department) via wireless communication such as WIFI or BLUETOOTH® or using the Internet of things (IOT). As shown in FIG. 3, based on the sensor fusion of ADAS sensors, the system detects potholes, wreckage/debris, and/or speed bumps and brakes and steers (e.g., into an adjacent traffic lane, onto a shoulder, etc.) to avoid or mitigate an accident. The system may transfer data (i.e., gathered from the sensors) to other vehicles or infrastructure via vehicle-to-vehicle (V2V) or vehicle-to-infrastructure (V2X) communications. The system may use sensor data (e.g., image data and/or radar data) to ensure the adjacent lane or shoulder is clear before maneuvering. When the adjacent lane is not clear (e.g., occupied by another vehicle), the system may determine that collision with the object is unavoidable and take other action instead (e.g., braking, adjusting suspension, etc.).

Figure 4:
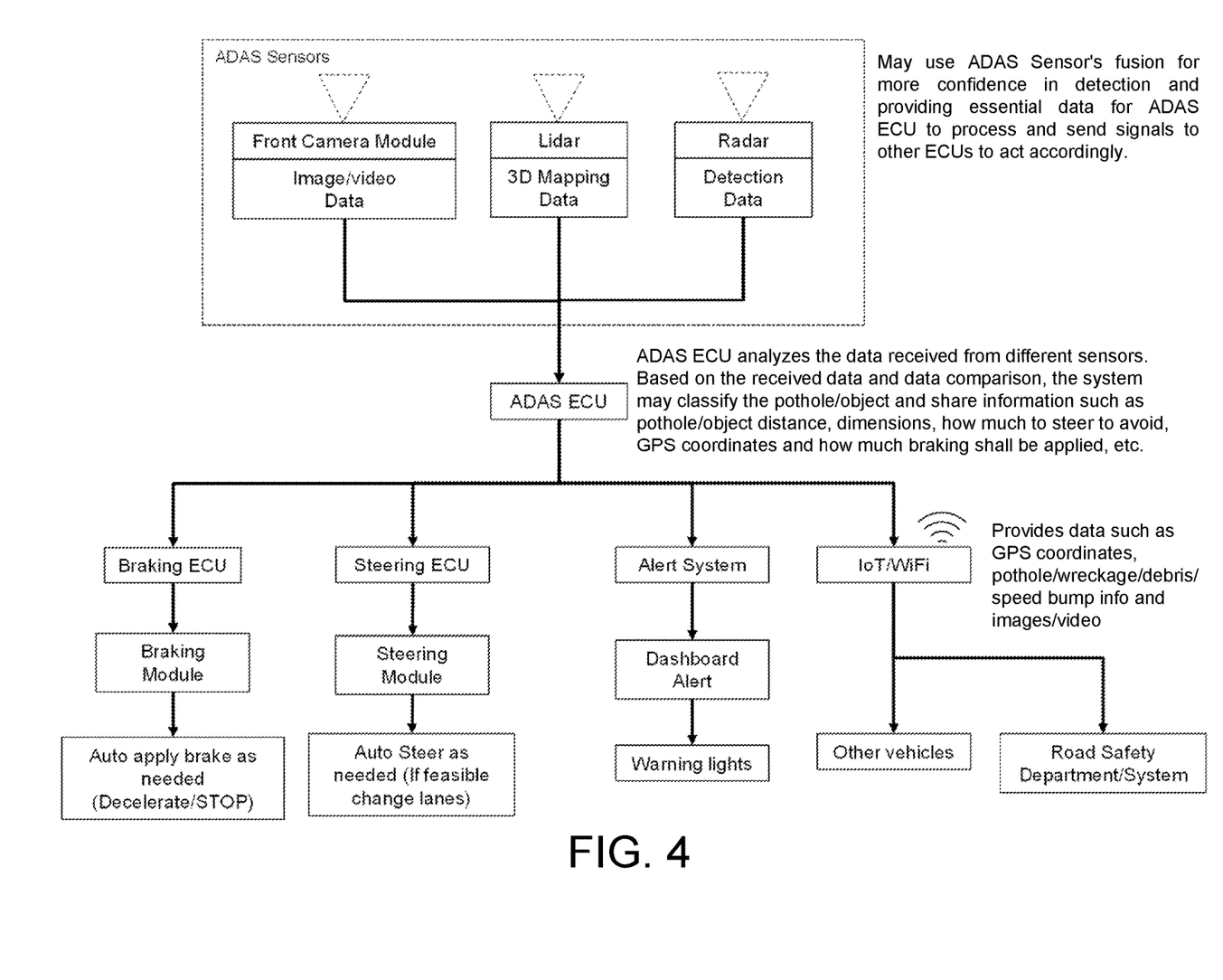
FIG. 4 is a block diagram of the vision system.

Referring now to FIG. 4, an exemplary block diagram of the system includes a plurality of sensors. Here, the sensors include a front camera module (FCM) that captures image data forward of the vehicle, a lidar sensor that captures 3D mapping data, and a radar sensor that captures object detection data. The system may use sensor fusion to increase confidence in detection and provide essential data for the ADAS ECU to process. The ADAS ECU receives the sensor data from each of the ADAS sensors. The ADAS ECU processes the sensor data (e.g., using sensor fusion) and, based on the processed sensor data, classifies detected objects. For example, the system may classify a detected object as a pothole, road debris, a speed bump, etc. For example, the system may classify two or more of (i) a pothole ahead of the vehicle, (ii) road debris ahead of the vehicle, (iii) and/or a speed bump ahead of the vehicle. The ADAS ECU may determine a distance to the object and dimensions of the object. The ADAS ECU may determine an avoidance strategy to avoid or mitigate the potential for a collision with the detected objects (e.g., apply braking or steering). The ADAS ECU may use data from a number of other sensors to determine the avoidance strategy. For example, the system may use GPS data and side/rear camera image data to determine safe adjacent lanes.

The ADAS ECU may provide an output (e.g., data and/or instructions) to a number of other ECUs. For example, the ADAS ECU may provide data to a braking ECU which controls a braking module that applies brakes as needed. As another example, the ADAS ECU may provide data to a steering ECU that controls a steering module to automatically steer the vehicle (when feasible or safe). The ADAS ECU may also communicate data to an alert system to alert occupants of the vehicle (e.g., via a display within the vehicle, an audible alert, etc.) or alert other vehicles (e.g., via brake lights, hazard lights, head lights, etc.). The ADAS ECU may wirelessly communicate data (e.g., via WIFI, BLUETOOTH®, etc.) to other vehicles/infrastructures. The wireless data may include GPS coordinates (i.e., the geographical location of the detected objects, classification data, image data, etc.). For example, the vehicle may report a location and size of a pothole to a road safety department.

Figure 5:
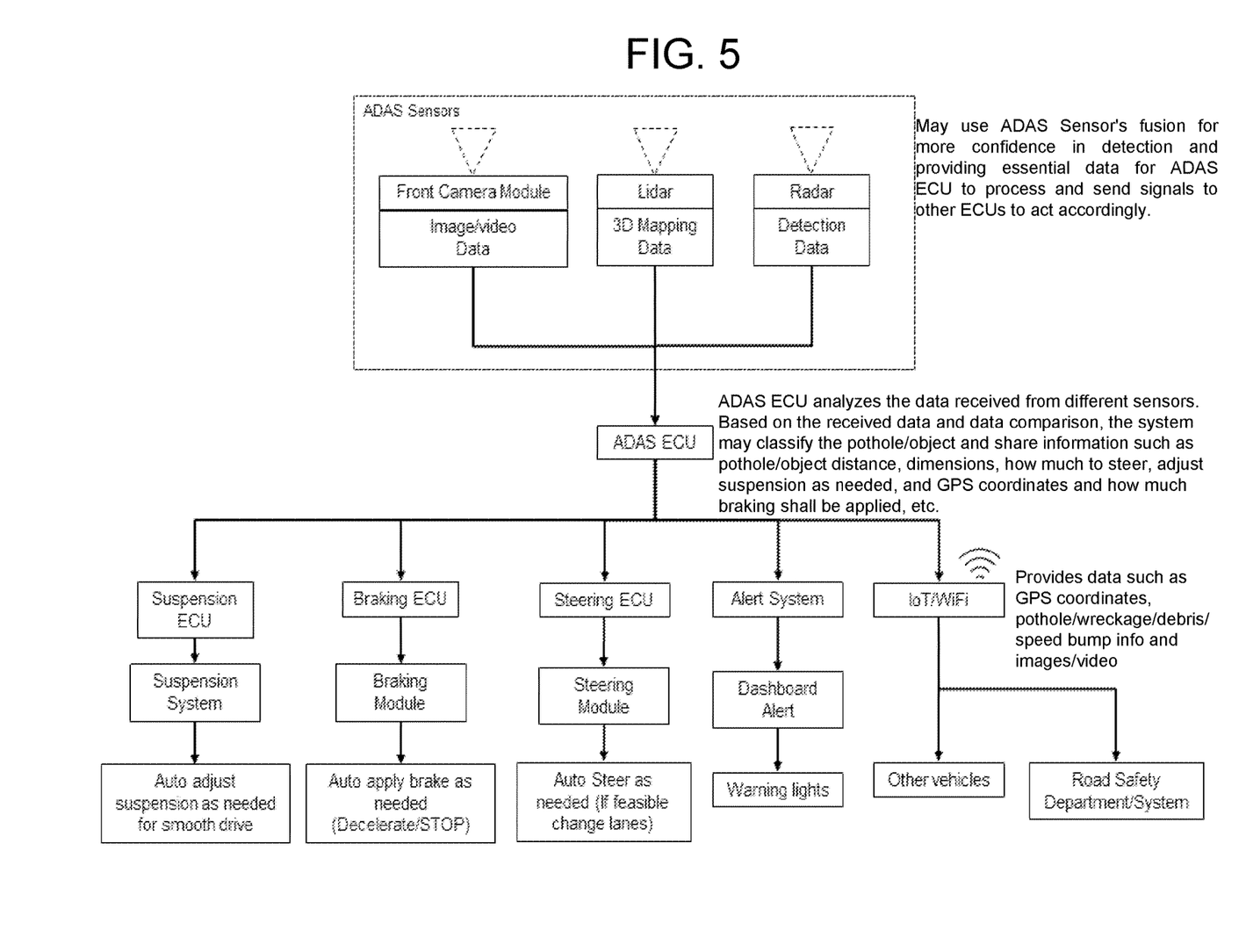
FIG. 5 is another block diagram of the vision system.

Referring now to FIG. 5, the system may include a suspension ECU that controls and/or monitors a suspension system of the vehicle. The suspension ECU may control the suspension to automatically adjust the suspension as needed to improve ride quality (e.g., a smoothness of the ride). For example, the ADAS ECU may analyze the sensor data, and when the ADAS ECU determines a potential for an upcoming disturbance (e.g., an object in the road, a pothole, a speed bump, etc.), the ADAS ECU may notify/command the suspension ECU, which in turn may soften the suspension (or change to a softer suspension setting, such as by changing the suspension from a "sport" mode to a "touring" mode) in anticipation of the disturbance in order to keep a smoother ride. After the potential for the disturbance has passed, the suspension ECU may return the suspension to a nominal range (or to the previous firmer suspension setting). In another example, the system may determine that suspension should be stiffened based on maneuvering of the vehicle and/or the quality of the road (e.g., for performance reasons, ride quality, etc.). For example, when the system determines that the avoidance strategy includes moving into an adjacent traffic lane, the system may stiffen the suspension temporarily during the maneuver, and after the maneuver is complete (either by maintaining travel in the new traffic lane or by returning to the original traffic lane after the object has been passed), return the suspension to the original setting.

Thus, the vehicle vision system and/or driver or driving assist system and/or object detection system and/or alert system captures data using a plurality of sensors and, using the sensors individually or using sensor fusion, detects the presence of potholes, road debris, speed bumps, and other obstacles in the road. The system includes an ADAS ECU that communicates data to one or more other ECUs to control the vehicle to avoid or mitigate collisions with the detected objects. The system may alert or report information related to the detected objects to other vehicles and/or infrastructure.

For autonomous vehicles suitable for deployment with the systems described herein, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

a plurality of sensors disposed at a vehicle equipped with the vehicular control system and sensing exterior of the vehicle, the plurality of sensors capturing sensor data;

a first electronic control unit (ECU) comprising electronic circuitry and associated software;

wherein the electronic circuitry of the first ECU comprises a processor for processing sensor data captured by at least one sensor of the plurality of sensors to detect presence of an object;

wherein the vehicular control system, responsive to processing by the processor of sensor data captured by the at least one sensor of the plurality of sensors, detects an object in a path of travel of the equipped vehicle as the equipped vehicle travels along a traffic lane of a road, and wherein the object comprises at least one selected from the group consisting of (i) a pothole ahead of the equipped vehicle in the traffic lane of the road, (ii) road debris ahead of the equipped vehicle in the traffic lane of the road, and (iii) a speed bump ahead of the equipped vehicle in the traffic lane of the road;

wherein the first ECU, responsive to detecting the object in the path of travel of the equipped vehicle, determines whether another vehicle is present in a traffic lane adjacent to the traffic lane along which the equipped vehicle is traveling;

wherein the first ECU, responsive to determining that another vehicle is present in the traffic lane adjacent to the traffic lane along which the equipped vehicle is traveling, provides output to a second ECU of the equipped vehicle, wherein the second ECU of the equipped vehicle is operable to control one or more selected from the group consisting of (i) braking of the equipped vehicle and (ii) suspension of the equipped vehicle; and wherein the second ECU of the equipped vehicle, responsive to receiving the provided output, controls the one or more selected from the group consisting of (i) braking of the equipped vehicle and (ii) suspension of the equipped vehicle.

2. The vehicular control system of claim 1, wherein the second ECU controls braking of the equipped vehicle.

3. The vehicular control system of claim 2, wherein the second ECU, responsive to receiving the provided output, engages a brake system of the equipped vehicle.

4. The vehicular control system of claim 2, wherein the first ECU, responsive to determining that another vehicle is present in the traffic lane adjacent to the traffic lane along which the equipped vehicle is traveling, provides output to a third ECU of the equipped vehicle, wherein the third ECU of the equipped vehicle is operable to control steering of the vehicle, and wherein the third ECU, responsive to receiving the provided output, steers the equipped vehicle into an adjacent traffic lane to avoid the detected object.

5. The vehicular control system of claim 1, wherein the vehicular control system, responsive to detecting the object in the path of travel of the equipped vehicle, wirelessly communicates data to another vehicle.

6. The vehicular control system of claim 1, wherein the vehicular control system, responsive to detecting the object in the path of travel of the equipped vehicle, wirelessly communicates data to a remote server.

7. The vehicular control system of claim 6, wherein the wirelessly communicated data comprises a geographical location of the detected object.

8. The vehicular control system of claim 1, wherein the vehicular control system, responsive to detecting the object in the path of travel of the equipped vehicle, generates an alert.

9. The vehicular control system of claim 8, wherein the alert comprises at least one selected from the group consisting of (i) a visual alert and (ii) an audible alert.

10. The vehicular control system of claim 1, wherein the vehicular control system, responsive to detecting the object in the path of travel of the equipped vehicle, enables lighting of the equipped vehicle to warn other vehicles of the detected object.

11. The vehicular control system of claim 1, wherein the plurality of sensors comprises (i) a forward viewing camera disposed at an in-cabin side of a windshield of the equipped vehicle and viewing through the windshield forward of the equipped vehicle and (ii) at least one selected from the group consisting of (a) a forward sensing lidar sensor and (b) a forward sensing radar sensor.

12. The vehicular control system of claim 1, wherein the plurality of sensors comprises a forward viewing camera disposed at an in-cabin side of a windshield of the equipped vehicle and viewing through the windshield forward of the equipped vehicle.

13. The vehicular control system of claim 1, wherein the plurality of sensors comprises, a forward sensing lidar sensor.

14. The vehicular control system of claim 1, wherein the plurality of sensors comprises a forward sensing radar sensor.

15. The vehicular control system of claim 1, wherein the plurality of sensors comprises (i) a forward viewing camera disposed at an in-cabin side of a windshield of the equipped vehicle and viewing through the windshield forward of the equipped vehicle, (ii) a forward sensing lidar sensor and (iii) a forward sensing radar sensor.

16. The vehicular control system of claim 1 wherein the second ECU controls suspension of the equipped vehicle.

17. The vehicular control system of claim 16, wherein the second ECU, responsive to receiving the provided output, adjusts a suspension system of the equipped vehicle.

18. A vehicular control system, the vehicular control system comprising:

a plurality of sensors disposed at a vehicle equipped with the vehicular control system and sensing exterior of the vehicle, the plurality of sensors capturing sensor data;

wherein the plurality of sensors comprises a forward viewing camera disposed at an in-cabin side of a windshield of the equipped vehicle and viewing through the windshield forward of the equipped vehicle, and wherein the forward viewing camera comprises a CMOS imaging array having at least one million photosensors arranged in rows and columns;

wherein the plurality of sensors comprises a forward sensing radar sensor;

a first electronic control unit (ECU) comprising electronic circuitry and associated software;

wherein the electronic circuitry of the first ECU comprises a processor for processing sensor data captured by at least one sensor of the plurality of sensors to detect presence of an object;

wherein the vehicular control system, responsive to processing by the processor of sensor data captured by the at least one sensor of the plurality of sensors, detects an object in a path of travel of the equipped vehicle as the equipped vehicle travels along a traffic lane of a road, and wherein the object comprises a pothole ahead of the equipped vehicle in the traffic lane of the road;

wherein the first ECU, responsive to detecting the object in the path of travel of the equipped vehicle, determines whether another vehicle is present in a traffic lane adjacent to the traffic lane along which the equipped vehicle is traveling wherein the first ECU, responsive to determining that another vehicle is present in the traffic lane adjacent to the traffic lane along which the equipped vehicle is traveling, provides output to a second ECU of the equipped vehicle, wherein the second ECU of the equipped vehicle is operable to at least control (i) braking of the equipped vehicle and (ii) suspension of the equipped vehicle; and wherein the second ECU, responsive to receiving the provided output, controls at least one of (i) braking of the equipped vehicle and (ii) suspension of the equipped vehicle.

19. The vehicular control system of claim 18, wherein the second ECU of the equipped vehicle, responsive to receiving the provided output, controls braking of the equipped vehicle.

20. The vehicular control system of claim 19, wherein the second ECU, responsive to receiving the provided output, adjusts a suspension system of the equipped vehicle.

21. A vehicular control system, the vehicular control system comprising:

a plurality of sensors disposed at a vehicle equipped with the vehicular control system and sensing exterior of the vehicle, the plurality of sensors capturing sensor data;

wherein the plurality of sensors comprises a forward viewing camera disposed at an in-cabin side of a windshield of the equipped vehicle and viewing through the windshield forward of the equipped vehicle, and wherein the forward viewing camera comprises a CMOS imaging array having at least one million photosensors arranged in rows and columns;

wherein the plurality of sensors comprises a forward sensing lidar sensor;

a first electronic control unit (ECU) comprising electronic circuitry and associated software;

wherein the electronic circuitry of the first ECU comprises a processor for processing sensor data captured by at least one sensor of the plurality of sensors to detect presence of an object;

wherein the vehicular control system, responsive to processing by the processor of sensor data captured by the at least one sensor of the plurality of sensors, detects an object in a path of travel of the equipped vehicle as the equipped vehicle travels along a traffic lane of a road, and wherein the object comprises at least one selected from the group consisting of (i) a pothole ahead of the equipped vehicle in the traffic lane of the road, (ii) road debris ahead of the equipped vehicle in the traffic lane of the road, and (iii) a speed bump ahead of the equipped vehicle in the traffic lane of the road;

wherein the first ECU, responsive to detecting the object in the path of travel of the equipped vehicle, determines whether another vehicle is present in a traffic lane adjacent to the traffic lane along which the equipped vehicle is traveling;

wherein the first ECU, responsive to determining that another vehicle is present in the traffic lane adjacent to the traffic lane along which the equipped vehicle is traveling, provides output to a second ECU of the equipped vehicle, wherein the second ECU of the equipped vehicle is operable to at least control braking of the equipped vehicle; and wherein the second ECU, responsive to receiving the provided output, controls braking of the equipped vehicle.

22. The vehicular control system of claim 21, wherein the second ECU of the equipped vehicle, responsive to receiving the provided output, controls steering of the equipped vehicle.

23. The vehicular control system of claim 22, wherein the second ECU, responsive to receiving the provided output, adjusts a suspension system of the equipped vehicle.

* * * * *